US011820232B2

(12) United States Patent
Kadowaki

(10) Patent No.: US 11,820,232 B2
(45) Date of Patent: Nov. 21, 2023

(54) TORQUE ROD

(71) Applicant: YAMASHITA RUBBER CO., LTD., Fujimino (JP)

(72) Inventor: Hirokazu Kadowaki, Saitama (JP)

(73) Assignee: YAMASHITA RUBBER CO., LTD., Fujimino (JP)

( * ) Notice: Subject to any disclaimer, the term of this patent is extended or adjusted under 35 U.S.C. 154(b) by 295 days.

(21) Appl. No.: 17/481,075

(22) Filed: Sep. 21, 2021

(65) Prior Publication Data
US 2022/0089011 A1 Mar. 24, 2022

(30) Foreign Application Priority Data
Sep. 23, 2020 (JP) .................... 2020-158267

(51) Int. Cl.
*B60K 5/12* (2006.01)

(52) U.S. Cl.
CPC .......... *B60K 5/1208* (2013.01); *B60K 5/1241* (2013.01)

(58) Field of Classification Search
CPC ..... B60K 5/1208; B60K 5/1241; F16F 1/374; F16F 1/3732; F16F 1/377
See application file for complete search history.

(56) References Cited

U.S. PATENT DOCUMENTS

| 2005/0254888 | A1* | 11/2005 | Oji | F16F 1/3849 403/187 |
| 2013/0320181 | A1 | 12/2013 | Kamei et al. | |
| 2015/0300446 | A1 | 10/2015 | Shimada | |
| 2019/0226543 | A1* | 7/2019 | Niwa | F16F 1/387 |
| 2019/0315218 | A1* | 10/2019 | Kawahara | B60K 5/1241 |
| 2019/0346001 | A1* | 11/2019 | Tanaka | F16F 1/3828 |
| 2020/0122561 | A1* | 4/2020 | Ueki | B60K 5/1208 |
| 2020/0384844 | A1* | 12/2020 | Kim | F16F 1/3863 |
| 2022/0063392 | A1* | 3/2022 | Cho | F16F 1/3835 |
| 2022/0176792 | A1* | 6/2022 | Kadowaki | F16F 1/3849 |

FOREIGN PATENT DOCUMENTS

| CN | 103348161 A | 10/2013 |
| JP | 2012-211604 A | 11/2012 |
| JP | 2014-105765 | 6/2014 |

OTHER PUBLICATIONS

Chinese Office Action dated Jun. 6, 2023 issued in corresponding Chinese application No. 202111112117.5; English machine translation included (20 pages).

* cited by examiner

*Primary Examiner* — Amy J. Sterling
(74) *Attorney, Agent, or Firm* — Rankin, Hill & Clark LLP

(57) ABSTRACT

A torque rod includes: a rod body; a first coupling section provided at one end in an X-axis direction as a longitudinal direction of the rod body and having a first center axis along a Y-axis direction orthogonal to the X-axis direction; and a second coupling section provided at the other end in the X-axis direction of the rod body and being larger than the first coupling section. The first coupling section includes: an outer member having a cylinder shape connected to the rod body; an inner member provided in the center of the outer member; and an elastic member to elastically join the outer member with the inner member, and the elastic member has a spring constant in a Z-axis direction orthogonal to the X-axis direction and the Y-axis direction smaller than a spring constant in the X-axis direction.

5 Claims, 11 Drawing Sheets

TORQUE ROD

CROSS-REFERENCE TO RELATED APPLICATION

The present application claims the benefit of priority to Japanese Patent Application No. 2020-158267 filed on Sep. 23, 2020, the disclosures of all of which are hereby incorporated by reference in their entireties.

TECHNICAL FIELD

The present disclosure relates to a torque rod, particularly to a torque rod which couples a prime mover such as an engine and a motor of an automobile to a vehicle body so as to isolate vibration from the former.

BACKGROUND

There has been a torque rod as an example of a vibration isolator which couples a prime mover such as an engine of an automobile to a vehicle body to isolate vibration from the former (see Japanese Patent Application Publication No. 2014-105765, for example, referred to as Patent Document 1 hereinbelow).

The torque rod includes a rod body which is an elongated member, a small round section provided at one end in a longitudinal direction of the rod body, and a large round section provided at the other end, which is larger than the small round section. The small round section and large round section each have an outer member connected to the rod body, an inner member provided in the center of the outer member, and an elastic member to elastically join the outer member with the inner member. The inner member of the small round section is coupled with a prime mover such as an engine, and the inner member of the large round section is coupled with a vehicle body.

SUMMARY

The torque rod having the structure described above suffers rigid body resonance in response to vibration, in the longitudinal direction or an up-down direction orthogonal to the longitudinal direction, of a prime mover such as an engine, for example. Particularly, vibration in the up-down direction affects an interior sound level, ride comfort, and the like, and therefore it is required to prevent the vibration in the up-down direction from being transmitted to a vehicle body.

A vibration transmission characteristic curve of a related (conventional) torque rod has a peak at a relatively high frequency near a resonance frequency of the vehicle body or the like, to have high vibration transmission characteristics in a frequency range having high sensitivity to the vehicle body side. With the high vibration transmission characteristics as described above, the vibration is not sufficiently blocked so that lower vibration transmission characteristics are required. Note that the frequency range having high sensitivity to the vehicle body is a frequency range near the resonance frequency of the vehicle body or the like, in which vibration is easily transmitted and noise is easily generated, and in which vibration is to be isolated.

If a peak frequency (referred to as a rigid body resonance frequency) of the rigid body resonance of the torque rod is shifted to a lower frequency with respect to the frequency range having high sensitivity to the vehicle body, the vibration transmission characteristics in the frequency range having high sensitivity is lowered. As a method for lowering the rigid body resonance frequency of the torque rod, a mass (weight) may be added to an end of the torque rod, for example. However, this contradicts to a basic requirement of reducing weight of the vehicle. Further, a method for reducing a spring constant in the up-down direction of the large round section coupled with the vehicle body is proposed in Patent Document 1 and the like, but the method has already reached technical maturity, and no significant development is expected.

In view of the problem as described above, the present disclosure is intended to provide a torque rod which has vibration transmission characteristics lowered without increasing weight, with a viewpoint different from a conventional one.

To solve the problems above, a torque rod according to the present disclosure includes: a rod body; a first coupling section, and a second coupling section. The rod body is an elongated member. The first coupling section is provided at one end in an X-axis direction as a longitudinal direction of the rod body and has a first center axis along a Y-axis direction orthogonal to the X-axis direction. The second coupling section is provided at the other end in the X-axis direction of the rod body and is larger than the first coupling section. The first coupling section includes: an outer member having a cylinder shape connected to the rod body; an inner member provided in the center of the outer member; and an elastic member to elastically join the outer member with the inner member. The elastic member has a spring constant in a Z-axis direction orthogonal to the X-axis direction and the Y-axis direction smaller than a spring constant in the X-axis direction.

When mounted on a vehicle, the torque rod according to the present disclosure is provided such that the Z-axis direction is set to be an up-down direction. When vibration in the up-down direction, which corresponds to the Z-axis direction, is inputted to the inner member of the first coupling section, the vibration in the up-down direction is efficiently absorbed by the first coupling section, due to the small spring constant in the Z-axis direction of the elastic member. Accordingly, a peak value of vibration transmission characteristics is lowered. Further, a rigid body resonance frequency is shifted to a lower frequency so that the vibration transmission characteristics in a frequency range having high sensitivity to a vehicle body is lowered. Still further, when the vibration in the up-down direction is transmitted from the first coupling section to the second coupling section, the elastic member of the first coupling section is twisted around the first center axis. In this case, a torsional spring constant of the elastic member is also resulted in being small so that the vibration transmission characteristics are lowered. Thus, an interior sound level is lowered, and ride comfort is improved.

That is, the present disclosure provides a torque rod which lowers vibration transmission characteristics without increasing weight, with a viewpoint different from a conventional one.

Note that "a peak value of vibration transmission characteristics is lowered" includes a case of the vibration transmission characteristics being flat (to have no peak value).

In the torque rod described above, it is assumed that a minimum length in the Y-axis direction of the elastic member located between the outer member and the inner member, in a cross-section cut by a plane including the first center axis and being in parallel to the Z-axis direction, is L1. Further, it is assumed that a minimum length in the Y-axis direction of the elastic member located between the outer member and the inner member, in a cross-section cut by a plane including the first center axis and being in parallel to the X-axis direction, is L2. In this case, L1 is preferably smaller than L2.

In this structure, the cross-sectional area of the portion of the elastic member, where the outer member is joined with the inner member in the Z-axis direction, is smaller than the cross-sectional area of the portion of the elastic member, where the outer member is joined with the inner member in the X-axis direction. Therefore, the spring constant in the Z-axis direction is made smaller than the spring constant in the X-axis direction, in the elastic member. Accordingly, the vibration transmission characteristics are lowered.

In the torque rod described above, the elastic member preferably has a bore section formed to be recessed or to penetrate in the Y-axis direction, on an outer side in the radial direction of the inner member, as viewed in the Z-axis direction.

In this structure, the cross-sectional area of the portion of the elastic member, where the outer member is joined with the inner member in the Z-axis direction, is made smaller than the cross-sectional area of the portion of the elastic member, where the outer member is joined with the inner member in the X-axis direction, due to the bore section. Therefore, the spring constant in the Z-axis direction is made smaller than the spring constant in the X-axis direction in the elastic member, with the simple structure. Thus, the vibration transmission characteristics are lowered.

In the torque rod described above, it is assumed that a thickness in the Z-axis direction of the elastic member located between the outer member and the inner member, in the cross-section cut by a plane including the first center axis and being in parallel to the Z-axis direction, is T1. Further, it is assumed that a thickness in the X-axis direction of the elastic member located between the outer member and the inner member, in the cross-section cut by the plane including the first center axis and being in parallel to the X-axis direction, is T2. In this case, T1 is preferably greater than T2.

In this structure, a length in a joining direction of the portion of the elastic member, where the outer member is joined with the inner member in the Z-axis direction, is larger than a length in a joining direction of the portion, where the outer member is joined with the inner member in the X-axis direction. Therefore, the spring constant in the Z-axis direction is made smaller than the spring constant in the X-axis direction in the elastic member. Thus, the vibration transmission characteristics are lowered.

In the torque rod described above, the inner member preferably has an outer peripheral surface on an outer side in the radial direction of the inner member, as viewed in the Z-axis direction, the outer peripheral surface having a recess formed to have an outer surface of the inner member recessed inward in the radial direction with respect to the outer peripheral surface.

In this structure, the elastic member is interposed between a bottom surface of the recess of the inner member and an inner surface of the outer member. As a result, a length in the joining direction of the portion of the elastic member, where the outer member is joined with the inner member in the Z-axis direction, is larger than a length in the joining direction of the portion of the elastic member, where the outer member is joined with the inner member in the X-axis direction. Therefore, the spring constant in the Z-axis direction is made smaller than the spring constant in the X-axis direction in the elastic member, with the simple structure. Thus, the vibration transmission characteristics are lowered.

With the present disclosure, a torque rod is provided, which has vibration transmission characteristics lowered without increasing weight, with a viewpoint different from a conventional one.

DETAILED DESCRIPTION

Next, a description is given in detail of embodiments to implement the present disclosure, with reference to the drawings as appropriate.

In each drawing, common or similar components are denoted by the same reference symbols and duplicate descriptions thereof are omitted as appropriate.

Note that, in the description below, an up-down direction, a front-rear direction, and a right-left direction indicate respective directions of a vehicle when a torque rod is mounted on the vehicle. Hereinbelow, the torque rod, which couples an engine of an automobile with a vehicle body so as to isolate vibration, is described.

First Embodiment

Referring to FIGS. 1 to 7, a description is given of a torque rod 1 of a first embodiment of the present disclosure.

Figure 1:
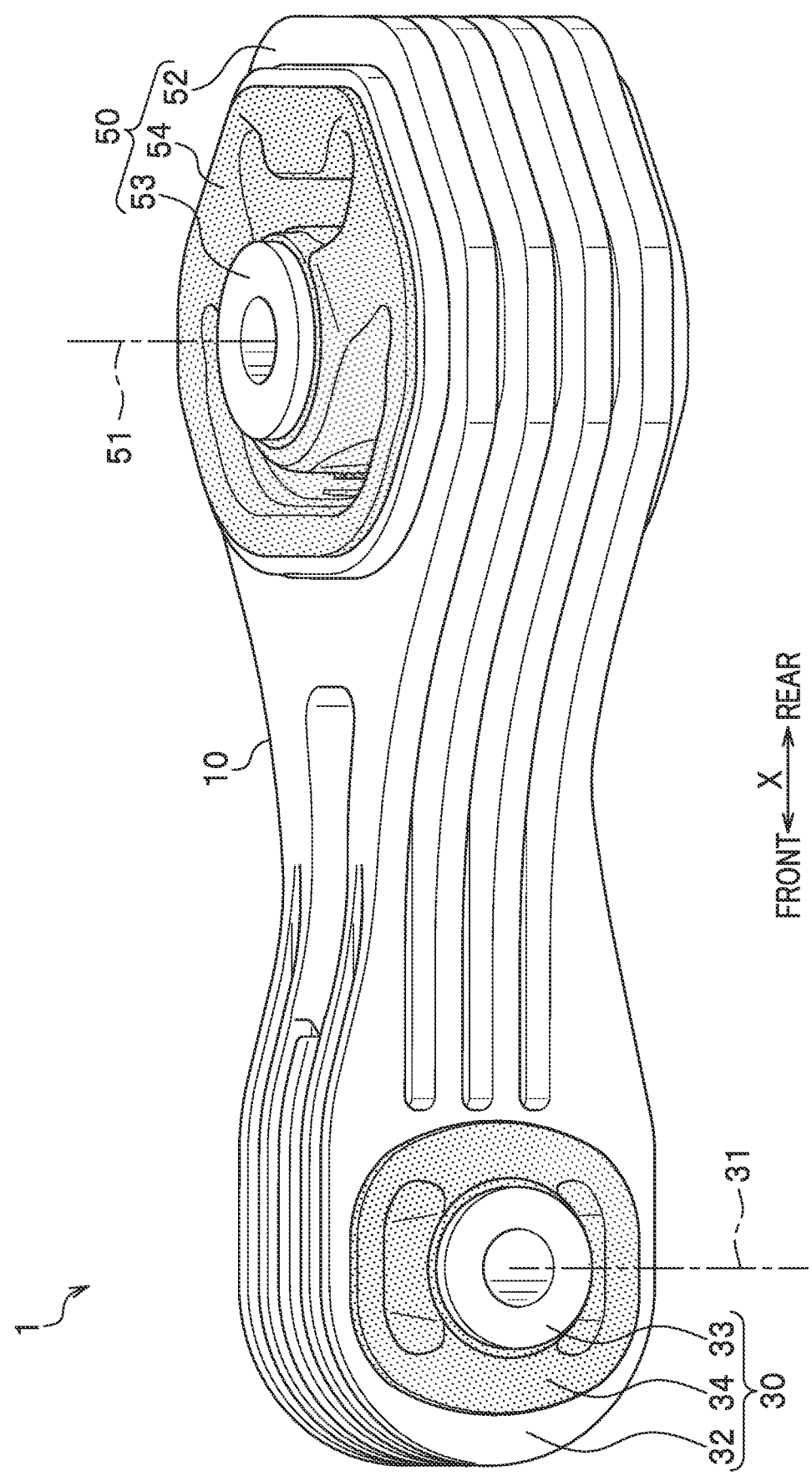
FIG. 1 is a perspective view of a torque rod according to a first embodiment.
Figure 2:
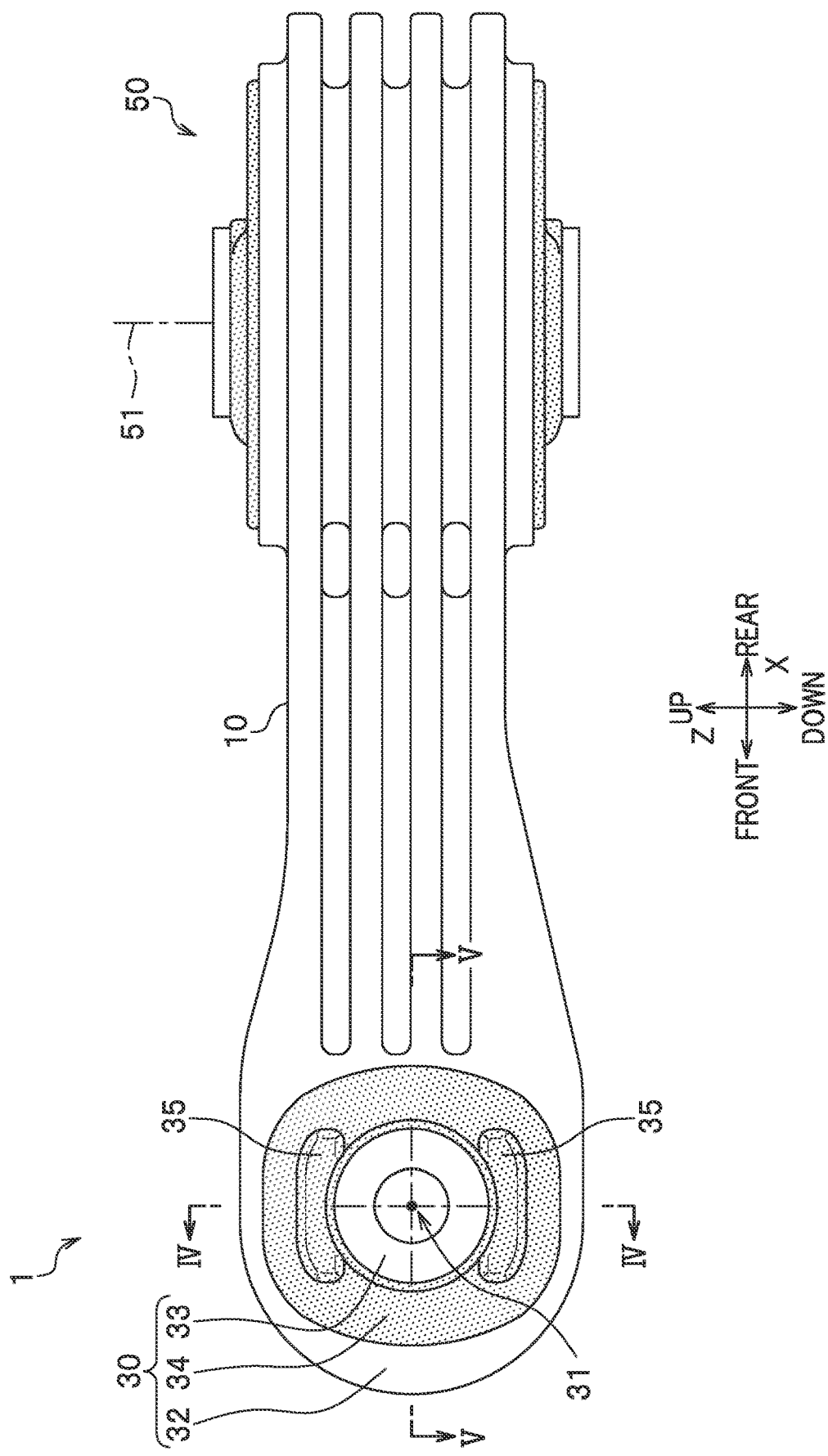
FIG. 2 is a side view of the torque rod according to the first embodiment.
Figure 3:
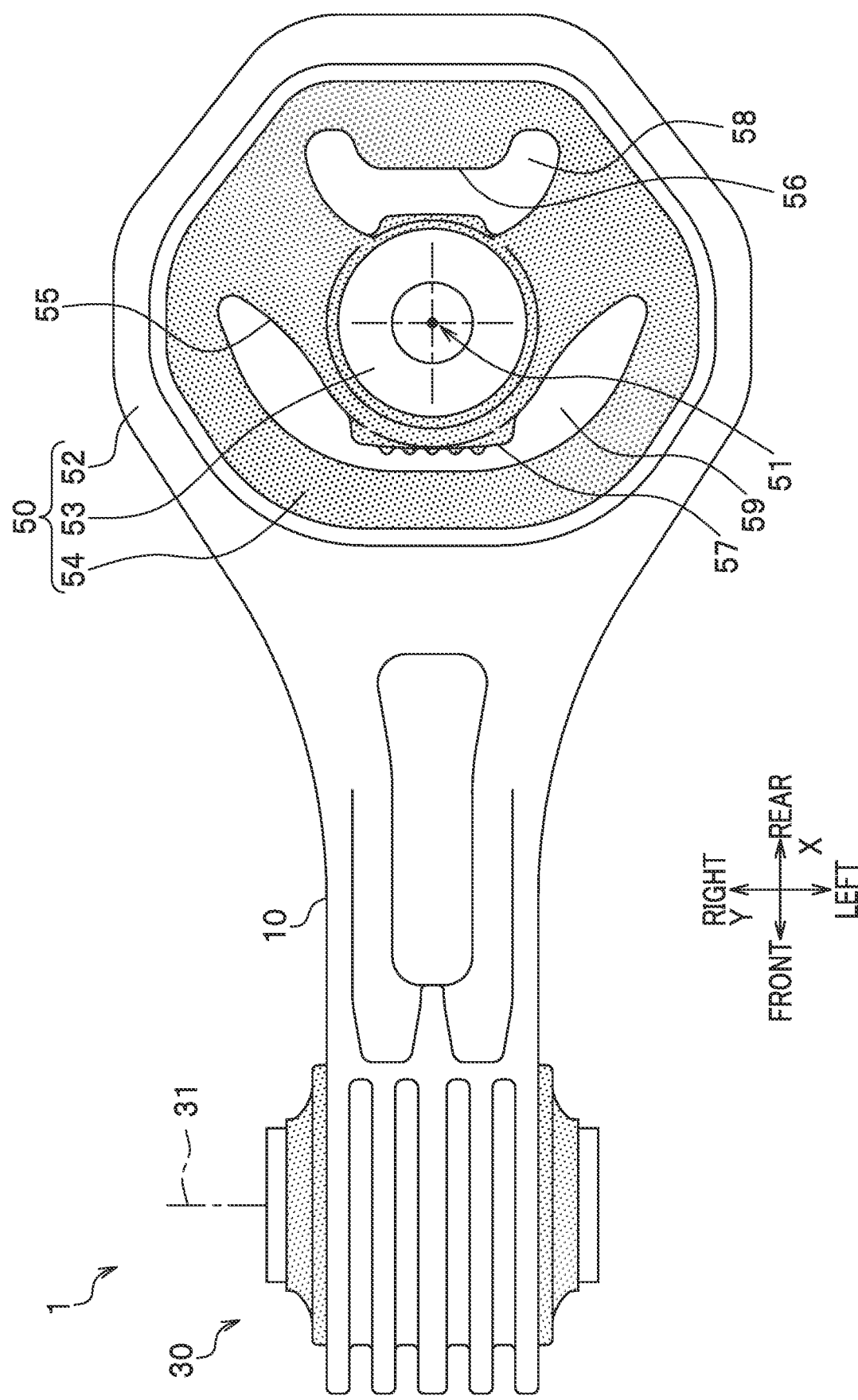
FIG. 3 is a plan view of the torque rod according to the first embodiment.
Figure 4:
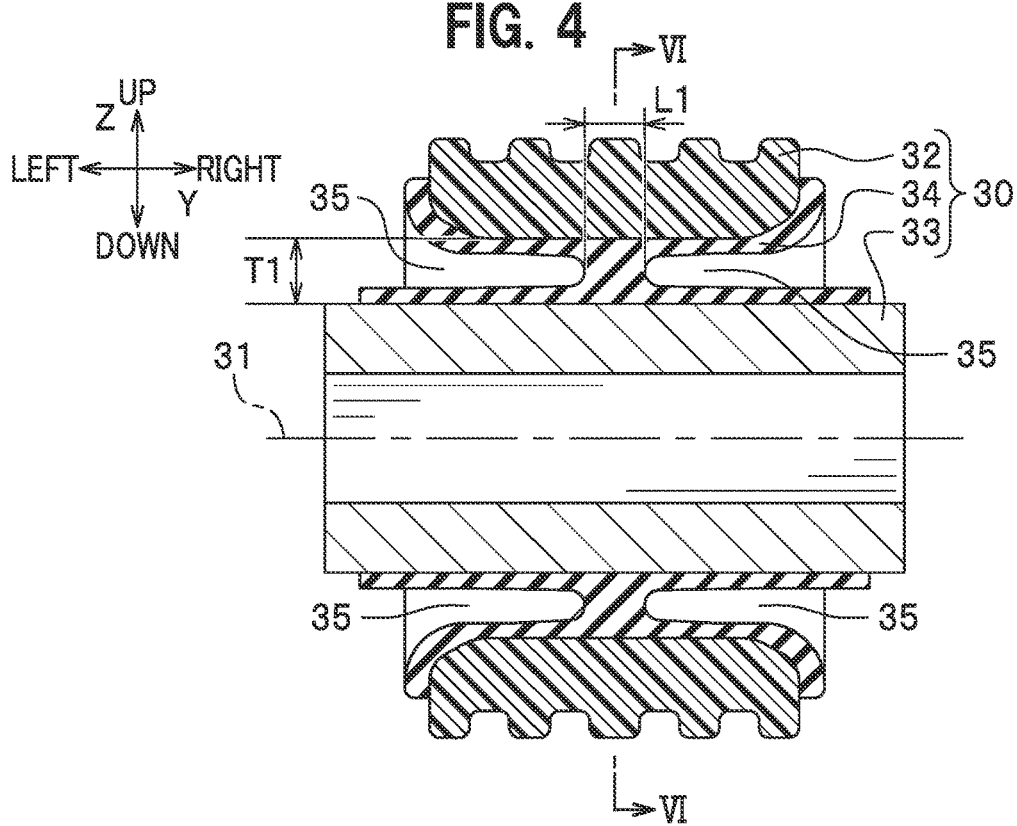
FIG. 4 is a cross-sectional view taken along a line IV-IV in FIG. 2.
Figure 5:
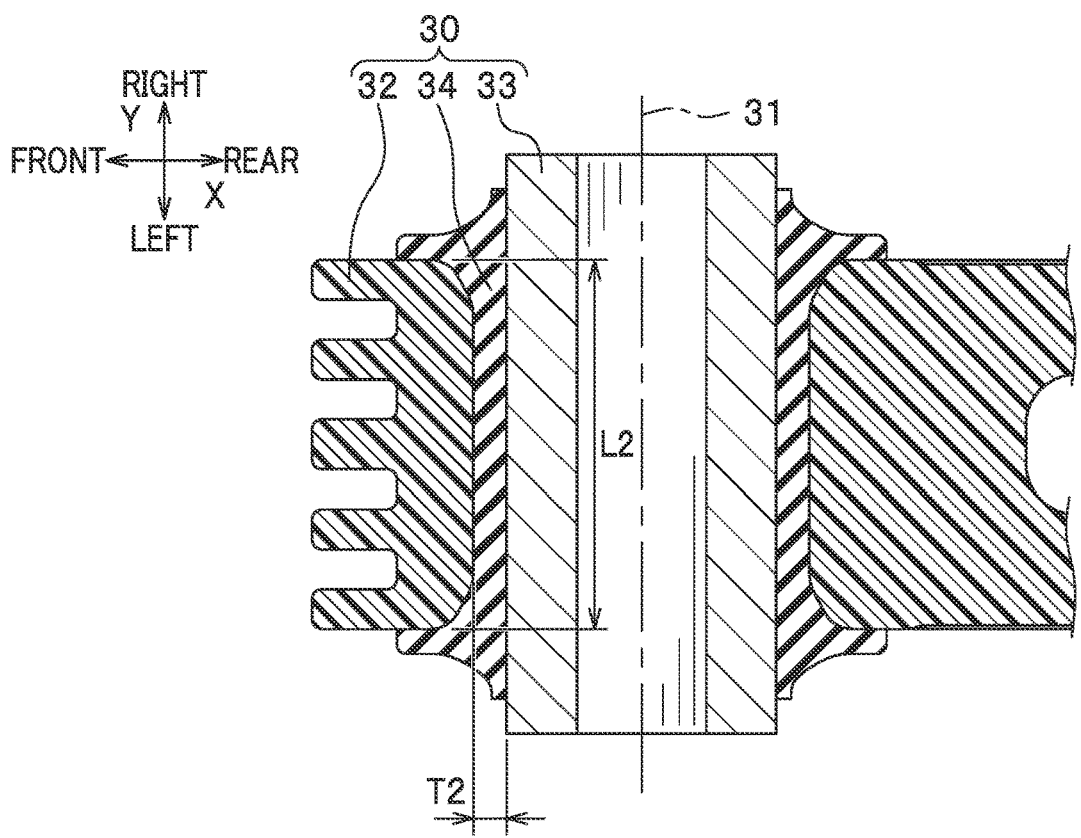
FIG. 5 is a cross-sectional view taken along a line V-V in FIG. 2.
Figure 6:
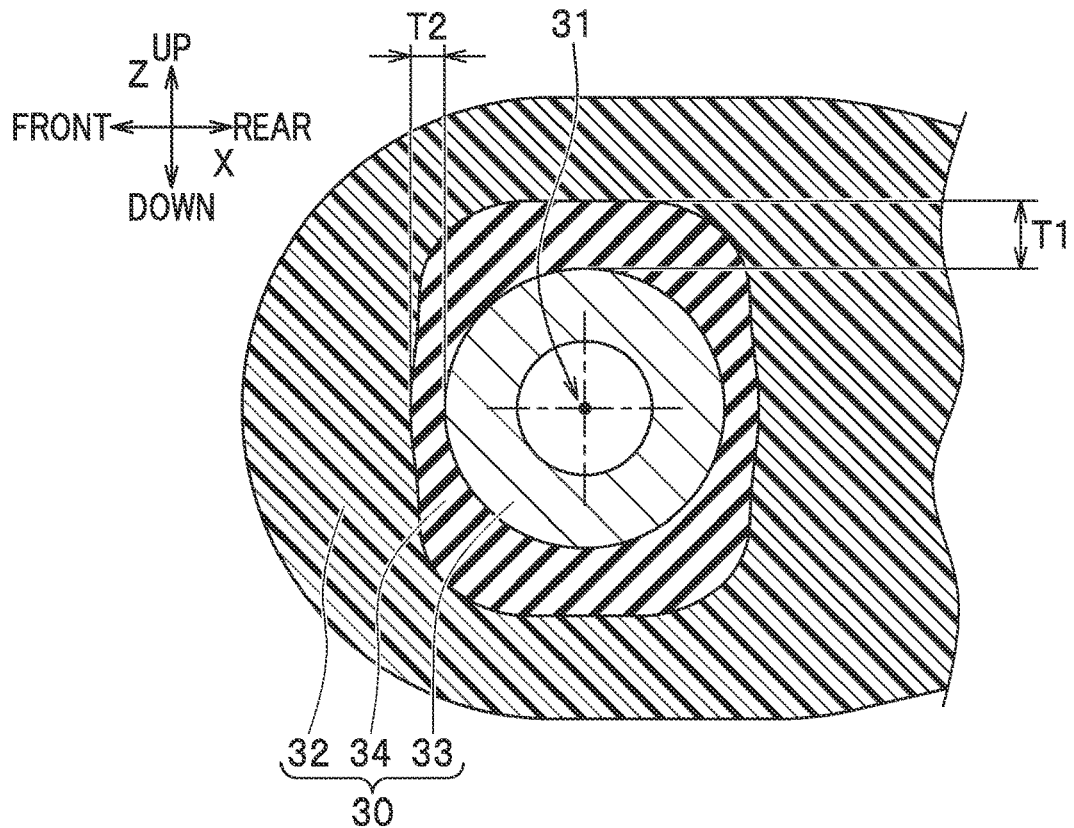
FIG. 6 is a cross-sectional view taken along a line VI-VI in FIG. 4.

FIG. 1 is a perspective view of the torque rod 1 according to the first embodiment. FIG. 2 is a side view of the torque rod 1 according to the first embodiment. FIG. 3 is a plan view of the torque rod 1 according to the first embodiment. FIG. 4 is a cross-sectional view taken along a line IV-IV in FIG. 2. FIG. 5 is a cross-sectional view taken along a line V-V in FIG. 2. FIG. 6 is a cross-sectional view taken along a line VI-VI in FIG. 4.

As illustrated in FIGS. 1 to 3, the torque rod 1 includes a rod body 10, a small round section 30 as a first coupling section, and a large round section 50 as a second coupling section.

The rod body 10 is an elongated member. A longitudinal direction of the rod body 10 is referred to as an X-axis, which corresponds to a front-rear direction.

The small round section 30 is provided at one end (corresponding to a front end) in the X-axis direction which is the longitudinal direction of the rod body 10. The small round section 30 has a first center axis 31 along a Y-axis direction orthogonal to the X-axis direction. The Y-axis direction corresponds to a right-left direction.

The large round section 50 is provided at the other end (corresponding to a rear end) in the X-axis direction of the rod body 10. The large round section 50 has a second center axis 51 along a Z-axis direction orthogonal to the X-axis direction and the Y-axis direction. The Z-axis direction corresponds to the up-down direction. The large round section 50 is larger than the small round section 30. Especially, the large round section 50 as viewed from the Z-axis direction (up-down direction) has a larger diameter than the small round section 30 as viewed from the Y-axis direction (right-left direction).

The small round section 30 includes an outer member 32, an inner member 33, and an elastic member 34. The outer member 32 has a cylindrical shape connected to the rod body 10. The outer member 32 is a hollow member having a through hole along a direction of the first center axis 31. The inner member 33 is provided in the center, that is, in an inner side in the radial direction, of the cylindrical outer member 32. Here, the inner member 33 has a cylindrical shape. The elastic member 34 elastically joins the outer member 32 with the inner member 33. The inner member 33 of the small round section 30 is to be coupled with the engine (not shown).

The large round section 50 includes an outer member 52, an inner member 53, and an elastic member 54. The outer member 52 has a cylindrical shape connected to the rod body 10. The outer member 52 is a hollow member having a through hole along a direction of the second center axis 51. The inner member 53 is provided in the center, that is, in an inner side in the radial direction, of the cylindrical outer member 52. Here, the inner member 53 has a cylindrical shape. The elastic member 54 elastically joins the outer member 52 with the inner member 53. The inner member 53 of the large round section 50 is to be coupled with the vehicle body (not shown).

The elastic members 34, 54 are made of rubber or the like. The inner member 33 is made of metal or the like. Here, the outer members 32, 52 and the rod body 10 are integrally formed of resin. In this case, the inner member 33 and the elastic member 34, and the inner member 53 and the elastic member 54 are integrally formed by vulcanization or the like, respectively. Then, the integrally formed inner member 33 and elastic member 34, and the integrally formed inner member 53 and elastic member 54 are placed in a mold, and resin is injection molded therearound to integrate the outer members 32, 52 and the rod body 10 therewith. The outer members 32, 52 and the rod body 10 have a plurality of ribs, which reduces weight while maintaining required rigidity.

When the engine is supported by the vehicle body via the torque rod 1, vibration from the engine is inputted from the inner member 33 via the elastic member 34 to the outer member 32, of the small round section 30. The vibration inputted to the outer member 32 of the small round section 30 is inputted via the rod body 10 to the outer member 52 of the large round section 50, and is further transmitted from the inner member 53 via the elastic member 54 to the vehicle body.

As illustrated in FIG. 3, the elastic member 54 of the large round section 50 includes a rubber foot 55 and stoppers 56, 57. On a rear side of the rubber foot 55, a bore section 58 is formed to penetrate in the Z-axis direction (up-down direction), and on a front side of the rubber foot 55, a bore section 59 is formed to penetrate in the Z-axis direction (up-down direction). Here, the bore sections 58, 59 are through-spaces. The rubber foot 55 has a substantially V-shape around the inner member 53. The rubber foot 55 absorbs the vibration in the X-axis direction (front-rear direction) of the large round section 50. In this case, deformation has a step in a soft spring state in which the bore sections 58, 59 are firstly collapsed to be deformed, and a step in a hard spring state in which the stoppers 56, 57 are subsequently brought in contact with opposing surfaces to be deformed. Further, the rubber foot 55 absorbs the vibration in the Z-axis direction (up-down direction) of the large round section 50. Note that the structure of the large round section 50 is not limited thereto and may be changed as appropriate.

As illustrated in FIG. 2, the elastic member 34 of the small round section 30 is designed to have a spring constant in the Z-axis direction (up-down direction) smaller than that in the X-axis direction (front-rear direction).

Here, as illustrated in FIG. 4, a minimum length in the Y-axis direction of the elastic member 34 located between the outer member 32 and the inner member 33, in a cross-section cut by a plane including the first center axis 31 and being in parallel to the Z-axis direction, is assumed to be L1. In other words, L1 indicates a length in a direction of the first center axis 31 of a portion of the elastic member 34, where the outer member 32 is joined with the inner member 33 in the Z-axis direction (up-down direction). Further, as illustrated in FIG. 5, a minimum length in the Y-axis direction of the elastic member 34 located between the outer member 32 and the inner member 33, in a cross-section cut by a plane including the first center axis 31 and being in parallel to the X-axis direction, is assumed to be L2. In other words, L2 indicates a length in the direction of the first center axis 31 of a portion of the elastic member 34, where the outer member 32 is joined with the inner member 33 in the X-axis direction (front-rear direction). In this case, L1 is set to be smaller than L2.

Especially, as illustrated in FIGS. 2 and 4, the elastic member 34 has bore sections 35 formed to be recessed in the Y-axis direction (right-left direction) on an outer side in the radial direction of the inner member 33, as viewed in the Z-axis direction (up-down direction). Here, the bore sections 35 are concave sections. The bore sections 35 are desirably formed at an upper, a lower, a right, and a left ends of the elastic member 34, respectively.

Further, as illustrated in FIGS. 4 and 6, a thickness in the Z-axis direction of the elastic member 34 located between the outer member 32 and the inner member 33, in the cross-section cut by a plane including the first center axis 31 and being in parallel to the Z-axis direction, is assumed to be T1. In other words, T1 indicates a thickness in the radial direction of a portion of the elastic member 34, where the outer member 32 is joined with the inner member 33 in the Z-axis direction (up-down direction). Further, as illustrated in FIGS. 5 and 6, a thickness in the X-axis direction of the elastic member 34 located between the outer member 32 and the inner member 33, in the cross-section cut by a plane including the first center axis 31 and being in parallel to the X-axis direction, is assumed to be T2. In other words, T2 is a thickness in the radial direction of the portion of the elastic member 34, where the outer member 32 is joined with the inner member 33 in the X-axis direction (front-rear direction). In this case, T1 is set to be larger than T2.

Figure 7:
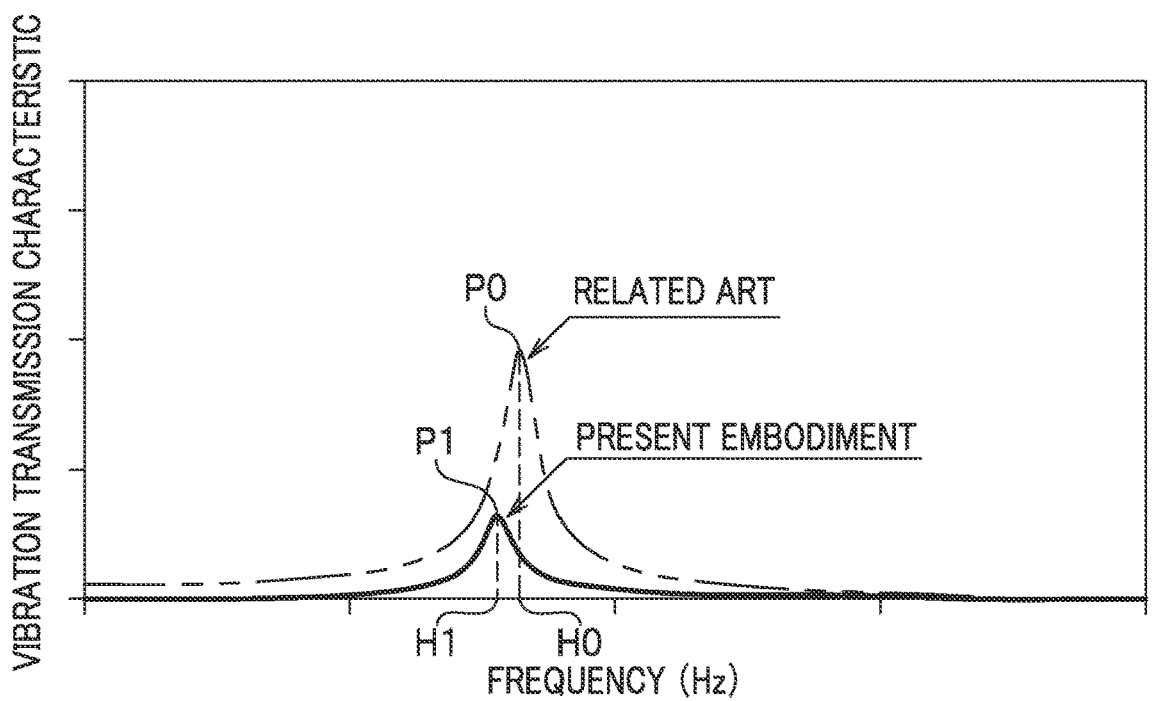
FIG. 7 is a graph showing a vibration transmission characteristic curve of the torque rod according to the first embodiment, along with that of a related (conventional) torque rod.

FIG. 7 shows a vibration transmission characteristic curve of the torque rod 1 of the first embodiment, along with that of a related (conventional) torque rod. Note that the related torque rod differs from the torque rod 1 of the first embodiment on the point that a spring constant of the elastic member of the small round section in the Z-axis direction is the same as that in the X-axis direction, and has the same structure in other portions as the torque rod 1.

As illustrated in FIG. 7, it is recognized that a peak value (maximum value) P1 of the vibration transmission characteristics of the torque rod 1 according to the first embodiment is lowered to approximately ⅓ of a peak value P0 of the vibration transmission characteristics of the related torque rod. Further, it is recognized that a rigid body resonance frequency H1 of the torque rod 1 according to the first embodiment is slightly shifted to a lower frequency with respect to a rigid body resonance frequency H0 of the related torque rod.

As described above, the torque rod 1 of the present embodiment includes the rod body 10, the small round section 30, and the large round section 50. The small round section 30 is provided at one end in the X-axis direction, which is the longitudinal direction, of the rod body 10, and has the first center axis 31 along the Y-axis direction orthogonal to the X-axis direction. The large round section 50 is provided at the other end in the X-axis direction of the rod body 10, and is larger than the small round section 30. The small round section 30 includes the cylindrical outer member 32 connected to the rod body 10, the inner member 33 provided in the center of the outer member 32, and the elastic member 34 which elastically joins the outer member 32 with the inner member 33. Further, the elastic member 34 of the small round section 30 has the spring constant in the Z-axis direction orthogonal to the X-axis and Y-axis directions, which is smaller than that in the X-axis direction.

When mounted on the vehicle, the torque rod 1 is installed such that the Z-axis direction is set in the up-down direction. When vibration in the up-down direction, which corresponds to the Z-axis direction, is inputted to the inner member 33 of the small round section 30, the vibration in the up-down direction is efficiently absorbed by the small round section 30, due to the small spring constant in the Z-axis direction of the elastic member 34. Accordingly, the peak value of the vibration transmission characteristics is lowered (see FIG. 7). Further, the rigid body resonance frequency is shifted to a lower frequency so that the vibration transmission characteristics in the frequency range having high sensitivity to a vehicle body is lowered (see FIG. 7). Still further, when the vibration in the up-down direction is transmitted from the small round section 30 to the large round section 50, the elastic member 34 of the small round section 30 is twisted around the first center axis 31. In this case, a torsional spring constant of the elastic member 34 is also resulted in being small so that the vibration transmission characteristics are lowered. Thus, an interior sound level is lowered, and ride comfort is improved.

As described above, in the present embodiment, unlike the conventional method focusing mainly on the structure of the large round section 50, the structure of the small round section 30 is focused to lower the vibration transmission characteristics.

In other words, the present embodiment provides the torque rod 1 to have the vibration transmission characteristics lowered without increasing weight, with a different viewpoint from the conventional one.

Further, in the present embodiment, the length L1 in the direction along the first center axis 31 of the portion of the elastic member 34, where the outer member 32 is joined with the inner member 33 in the Z-axis direction, is smaller than the length L2 in the direction along the first center axis 31 of the portion of the elastic member 34, where the outer member 32 is joined with the inner member 33 in the X-axis direction.

In this structure, the cross-sectional area of the portion of the elastic member 34, where the outer member 32 is joined with the inner member 33 in the Z-axis direction, is smaller than the cross-sectional area of the portion of the elastic member 34, where the outer member 32 is joined with the inner member 33 in the X-axis direction. Therefore, the spring constant in the Z-axis direction is made smaller than the spring constant in the X-axis direction, in the elastic member 34. Accordingly, the vibration transmission characteristics are lowered.

Further, in the present embodiment, the elastic member 34 has the bore sections 35 recessed in the Y-axis direction, on the outer side in the radial direction of the inner member 33, as viewed in the Z-axis direction.

In this structure, the cross-sectional area of the portion of the elastic member 34, where the outer member 32 is joined with the inner member 33 in the Z-axis direction, is made smaller than the cross-sectional area of the portion of the elastic member 34, where the outer member 32 is joined with the inner member 33 in the X-axis direction, due to the bore sections 35. Therefore, the spring constant in the Z-axis direction is made smaller than the spring constant in the X-axis direction in the elastic member 34, with the simple structure. Thus, the vibration transmission characteristics are lowered.

Further, in the present embodiment, the thickness T1 in the radial direction of the portion of the elastic member 34, where the outer member 32 is joined with the inner member 33 in the Z-axis direction, is larger than the thickness T2 in the radial direction of the portion of the elastic member 34, where the outer member 32 is joined with the inner member 33 in the X-axis direction.

In this structure, the length in a joining direction of the portion of the elastic member 34, where the outer member 32 is joined with the inner member 33 in the Z-axis direction, is larger than the length in a joining direction of the portion of the elastic member 34, where the outer member 32 is joined with the inner member 33 in the X-axis direction. Therefore, the spring constant in the Z-axis direction is made smaller than the spring constant in the X-axis direction in the elastic member 34. Thus, the vibration transmission characteristics are lowered.

Second Embodiment

Next, referring to FIGS. 8 to 11, a description is given of a torque rod 1a of a second embodiment of the present disclosure. The following description of the second embodiment of the present disclosure mainly focuses on points different from the first embodiment, and descriptions of common or similar components are omitted as appropriate.

Figure 8:
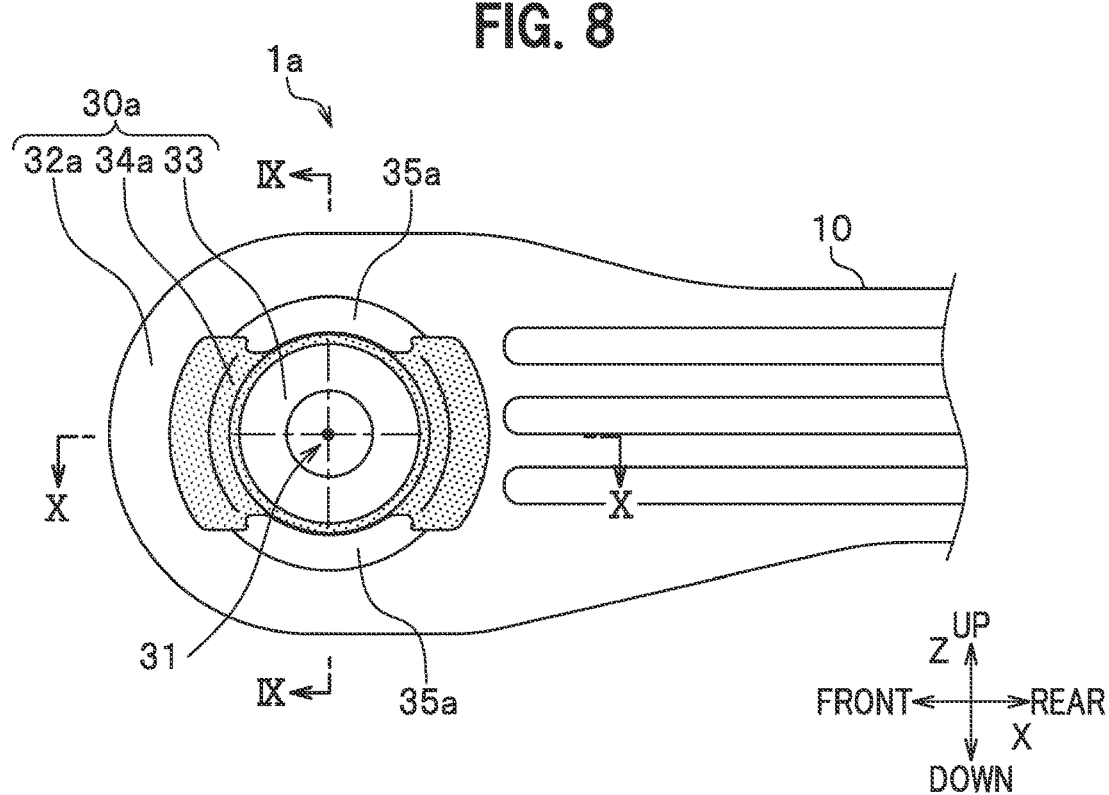
FIG. 8 is a side view of main parts of a torque rod according to a second embodiment.
Figure 9:
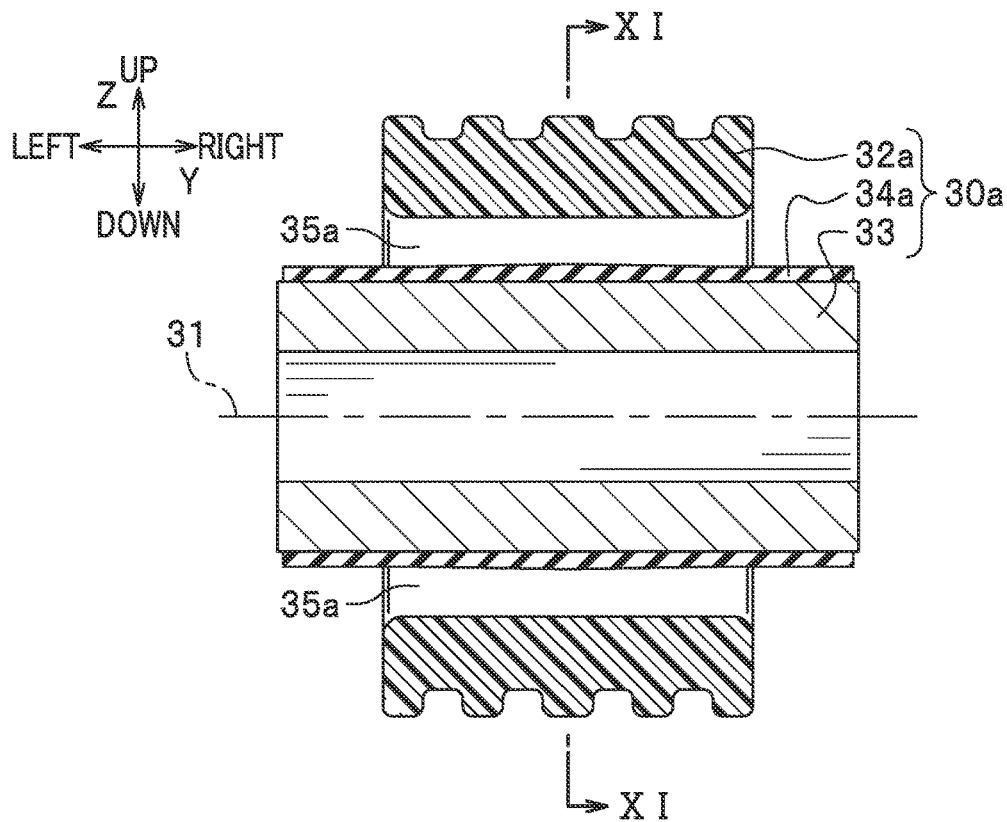
FIG. 9 is a cross-sectional view taken along a line IX-IX in FIG. 8.
Figure 10:
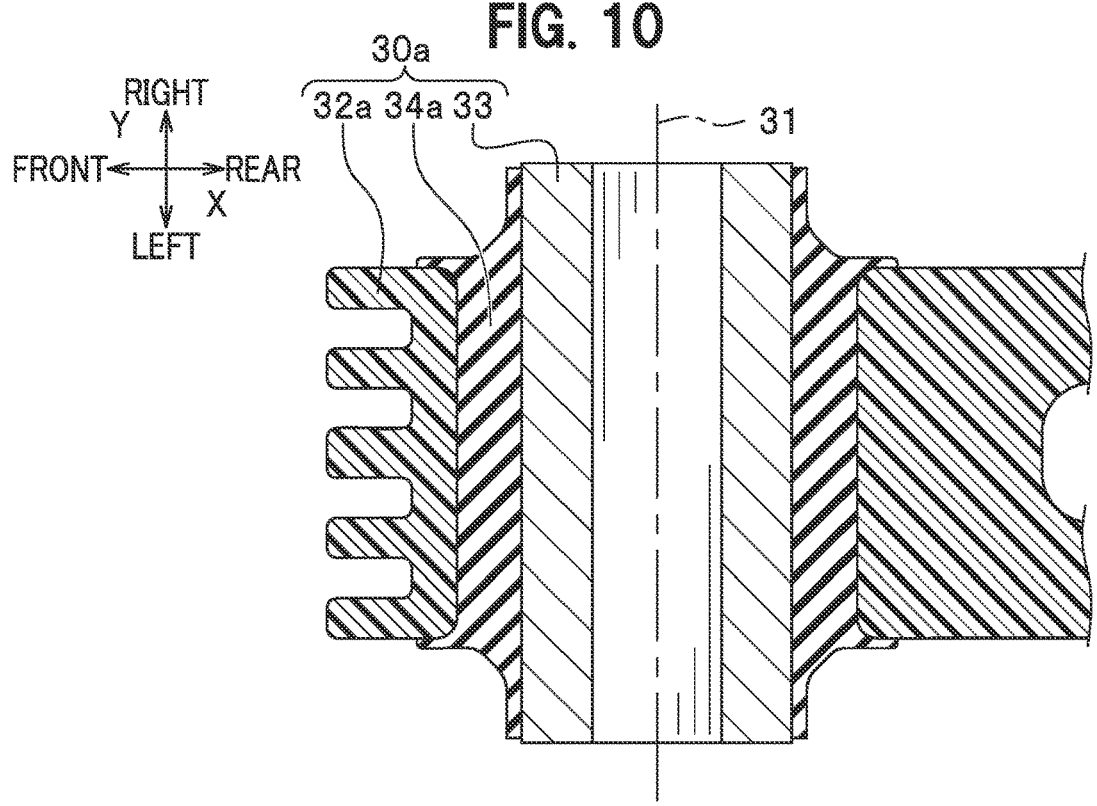
FIG. 10 is a cross-sectional view taken along a line X-X in FIG. 8.
Figure 11:
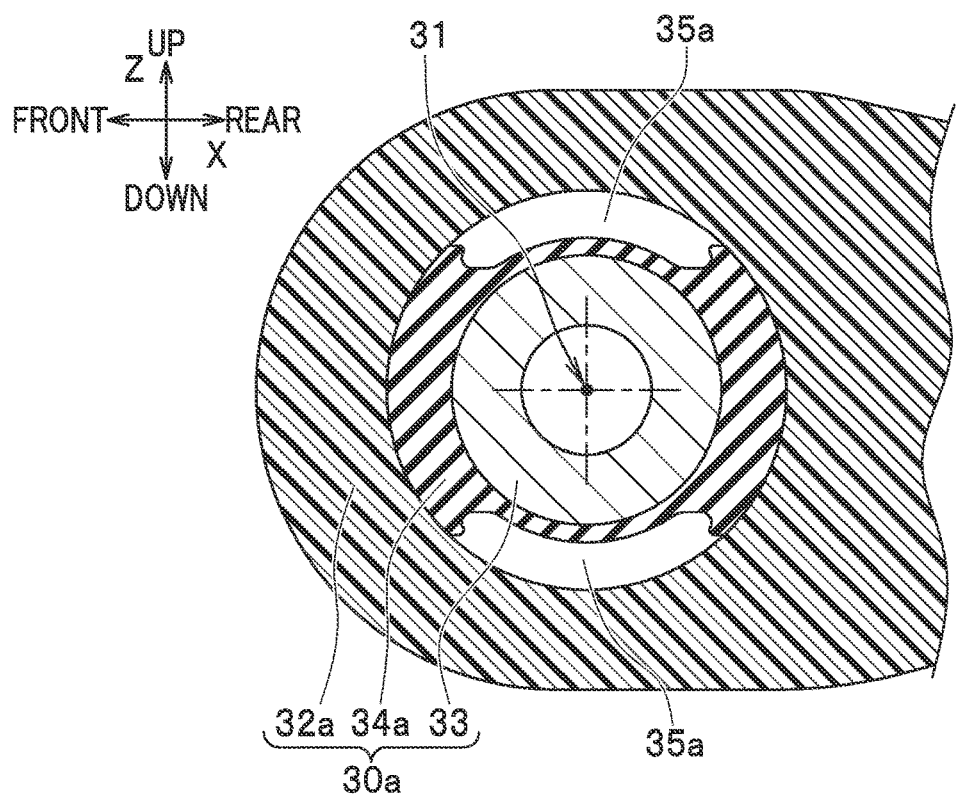
FIG. 11 is a cross-sectional view taken along a line XI-XI in FIG. 9.

FIG. 8 is a side view of main parts of the torque rod 1a according to the second embodiment. FIG. 9 is a cross-sectional view taken along a line IX-IX in FIG. 8. FIG. 10 is a cross-sectional view taken along a line X-X in FIG. 8. FIG. 11 is a cross-sectional view taken along a line XI-XI in FIG. 9.

As illustrated in FIGS. 8 to 11, the torque rod 1a includes a small round section 30a as a first coupling section provided at the front end of the rod body 10. The small round section 30a includes an outer member 32a, the inner member 33, and an elastic member 34a.

In the second embodiment, the elastic member 34a has bore sections 35a each formed to penetrate in the Y-axis direction (right-left direction), on an outer side in the radial direction of the inner member 33, as viewed in the Z-axis direction (up-down direction). The bore sections 35a here are through-spaces. The bore sections 35a are desirably formed at each of the upper and lower ends of the elastic member 34a.

According to the second embodiment as described above, the cross-sectional area of the portion of the elastic member 34a, where the outer member 32a is joined with the inner member 33 in the Z-axis direction, becomes zero, due to the bore sections 35a penetrating in the Y-axis direction (right-left direction). In other words, the cross-sectional area of the portion of the elastic member 34a, where the outer member 32a is joined with the inner member 33 in the Z-axis direction, becomes smaller than the cross-sectional area of the portion of the elastic member 34a, where the outer member 32a is joined with the inner member 33 in the X-axis direction. Therefore, the spring constant in the Z-axis direction is made smaller than the spring constant in the X-axis direction in the elastic member 34a, with the simple structure. Thus, the vibration transmission characteristics are lowered.

Third Embodiment

Next, referring to FIGS. 12 to 15, a description is given of a torque rod 1b of a third embodiment of the present disclosure. The following description of the third embodiment of the present disclosure mainly focuses on points different from the first embodiment, and descriptions of common or similar components are omitted as appropriate.

Figure 12:
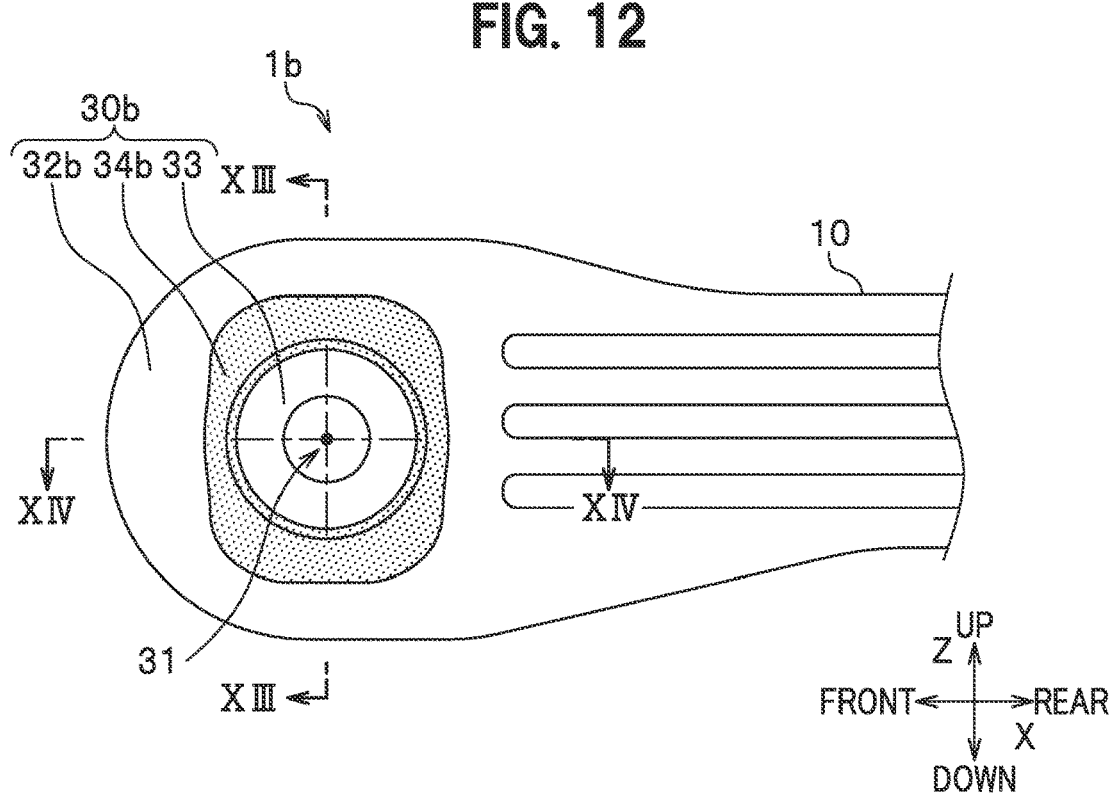
FIG. 12 is a side view of main parts of a torque rod according to a third embodiment.
Figure 13:
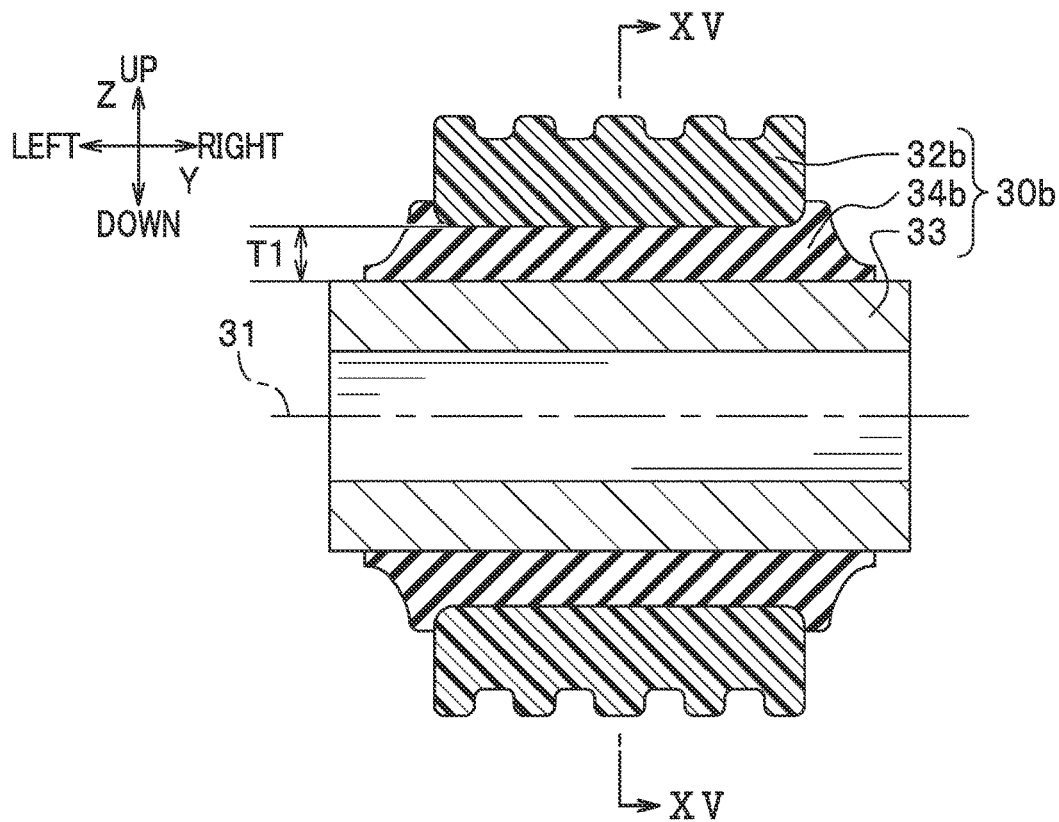
FIG. 13 is a cross-sectional view taken along a line XIII-XIII in FIG. 12.
Figure 14:
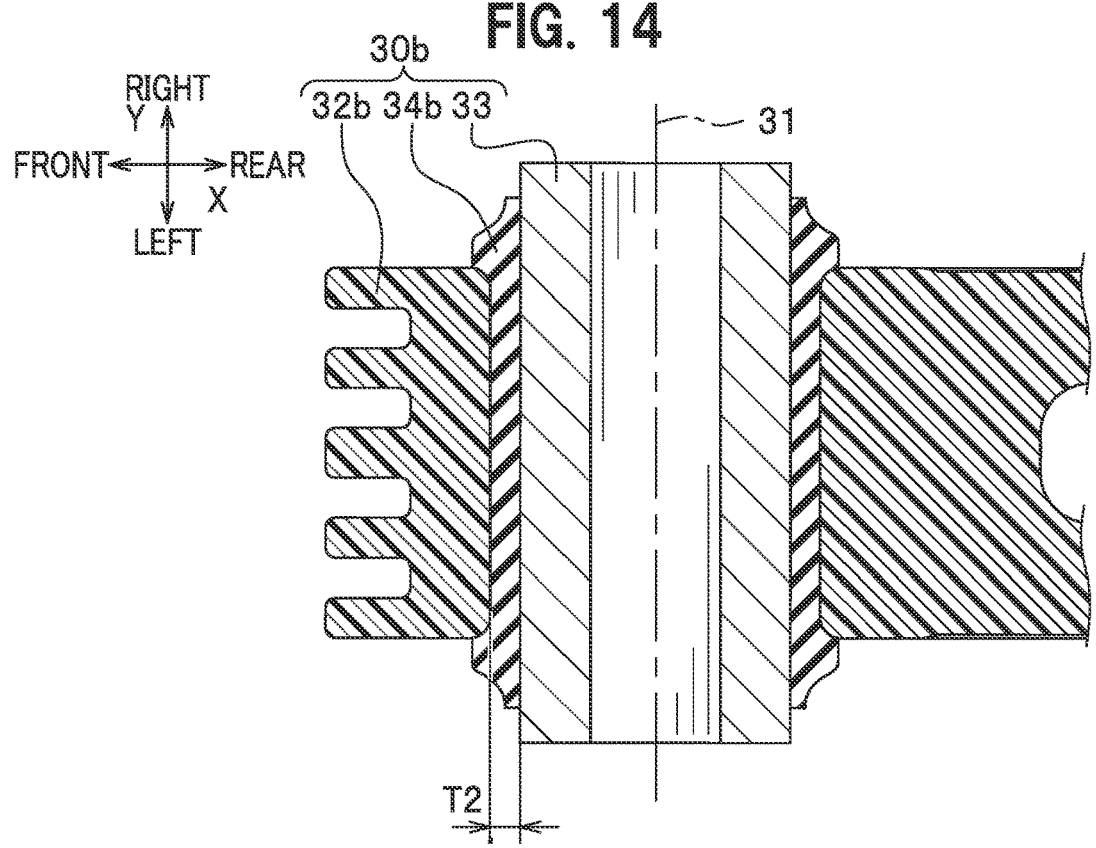
FIG. 14 is a cross-sectional view taken along a line XIV-XIV in FIG. 12.
Figure 15:
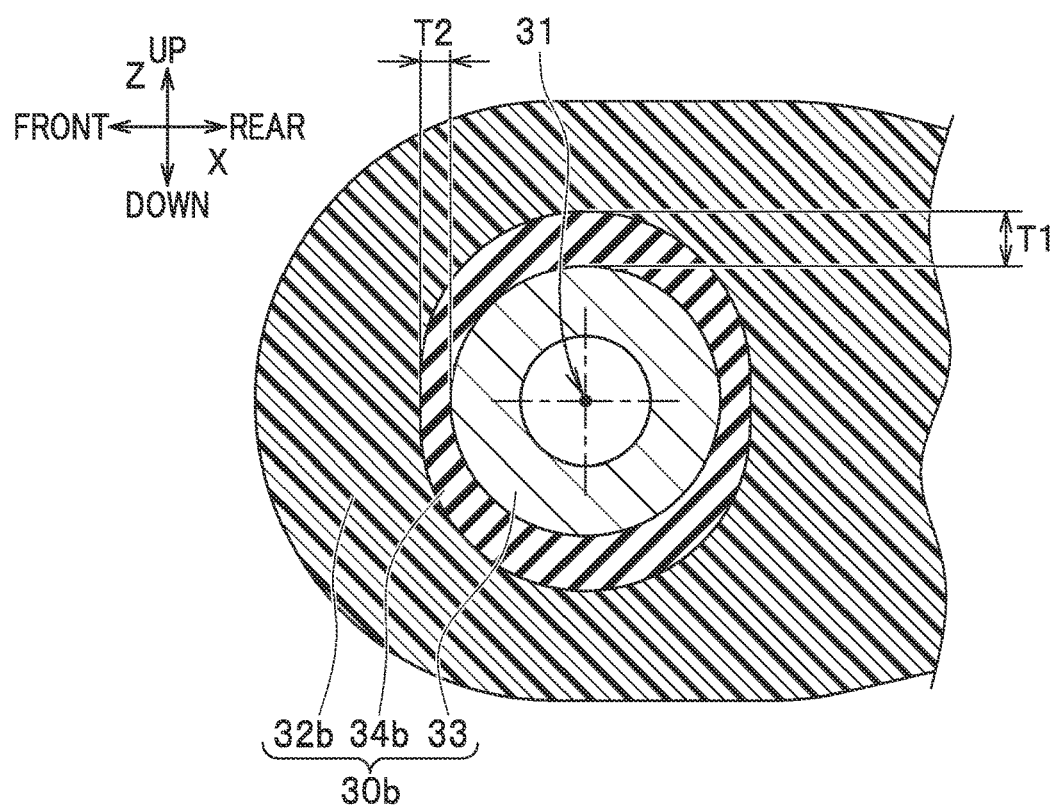
FIG. 15 is a cross-sectional view taken along a line XV-XV in FIG. 13.

FIG. 12 is a side view of main parts of the torque rod 1b according to the third embodiment. FIG. 13 is a cross-sectional view taken along a line XIII-XIII in FIG. 12. FIG. 14 is a cross-sectional view taken along a line XIV-XIV in FIG. 12. FIG. 15 is a cross-sectional view taken along a line XV-XV in FIG. 13.

As illustrated in FIGS. 12 to 15, the torque rod 1b includes a small round section 30b as a first coupling section provided at the front end of the rod body 10. The small round section 30b includes an outer member 32b, the inner member 33, and an elastic member 34b.

In the third embodiment, the elastic member 34b does not have the bore sections 35 of the first embodiment. Meanwhile, the thickness T1 in the radial direction of the portion of the elastic member 34b, where the outer member 32 is joined with the inner member 33 in the Z-axis direction, is larger than the thickness T2 in the radial direction of the portion of the elastic member 34b, where the outer member 32 is joined with the inner member 33 in the X-axis direction. This is the same as in the first embodiment. Especially, in the cross-sectional view of FIG. 15, an inner peripheral surface of the outer member 32b has an oval or elliptical shape in which a diameter in the up-down direction is larger than a diameter in the front-rear direction.

According to the third embodiment as described above, though the effect of the bore sections 35 of the first embodiment is not obtained, the spring constant in the Z-axis direction is made smaller than the spring constant in the X-axis direction in the elastic member 34b. Thus, the vibration transmission characteristics are lowered.

Fourth Embodiment

Next, referring to FIGS. 16 to 19, a description is given of a torque rod 1c according to a fourth embodiment of the present disclosure. The following description of the fourth embodiment of the present disclosure mainly focuses on points different from the third embodiment, and descriptions of common or similar components are omitted as appropriate.

Figure 16:
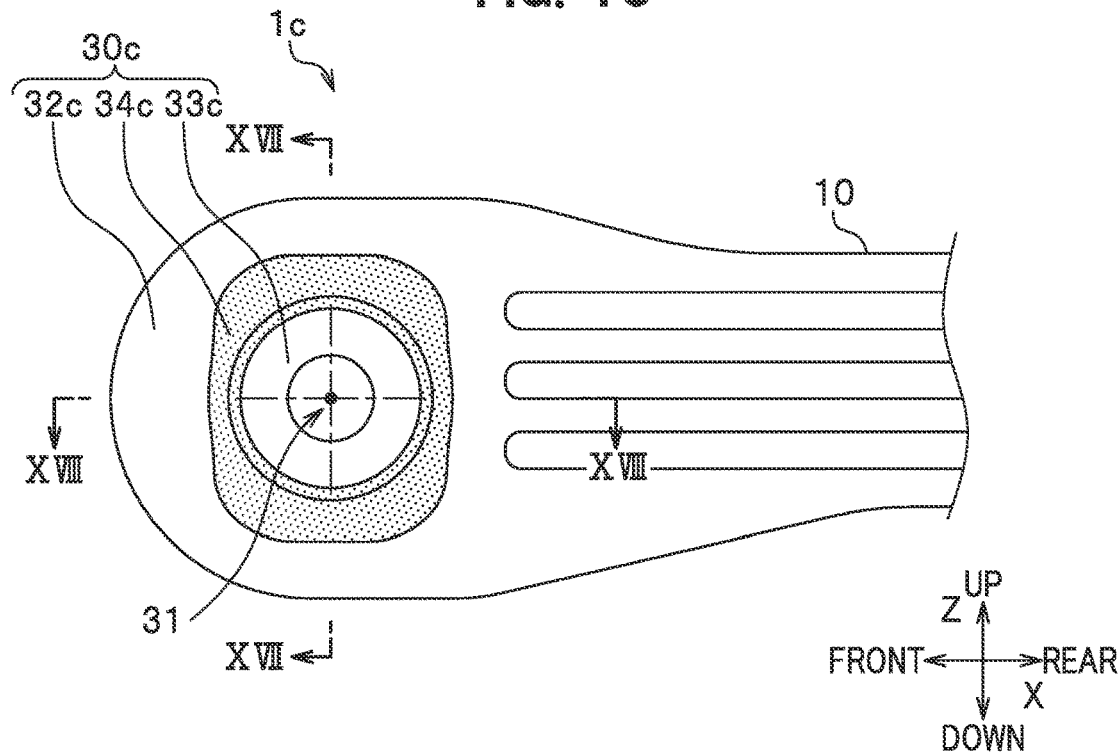
FIG. 16 is a side view of main parts of a torque rod according to a fourth embodiment.
Figure 17:
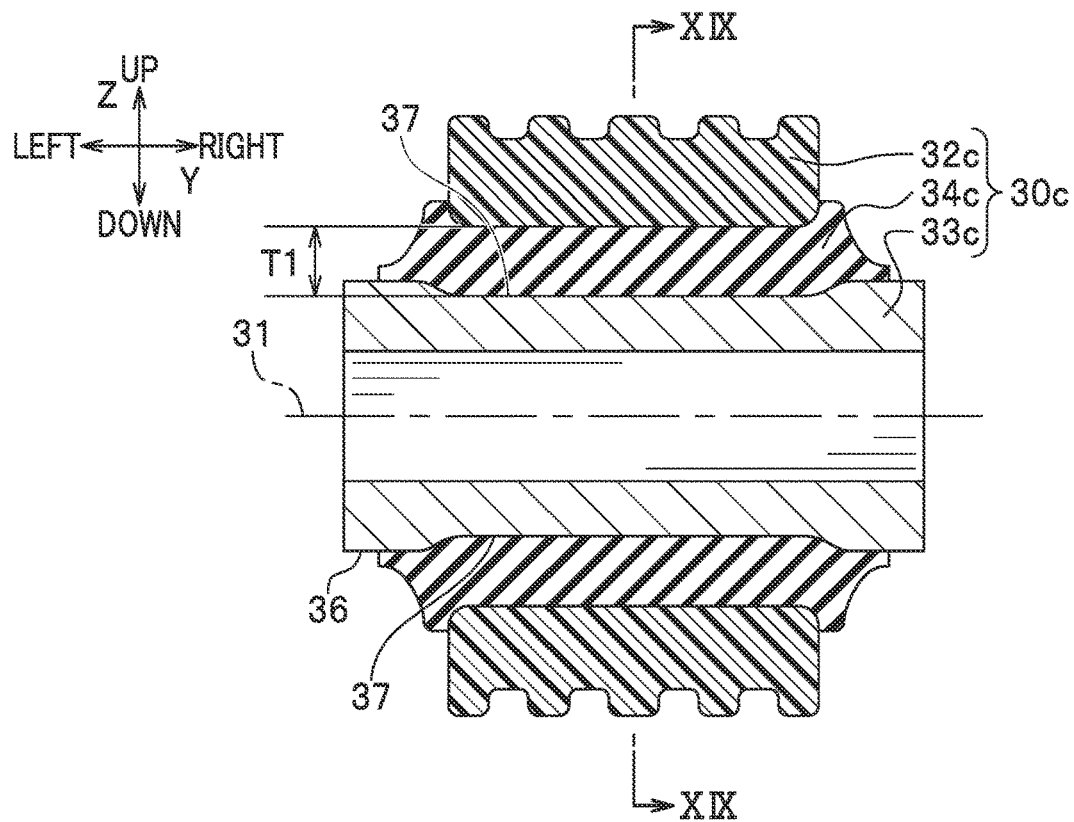
FIG. 17 is a cross-sectional view taken along a line XVII-XVII in FIG. 16.
Figure 18:
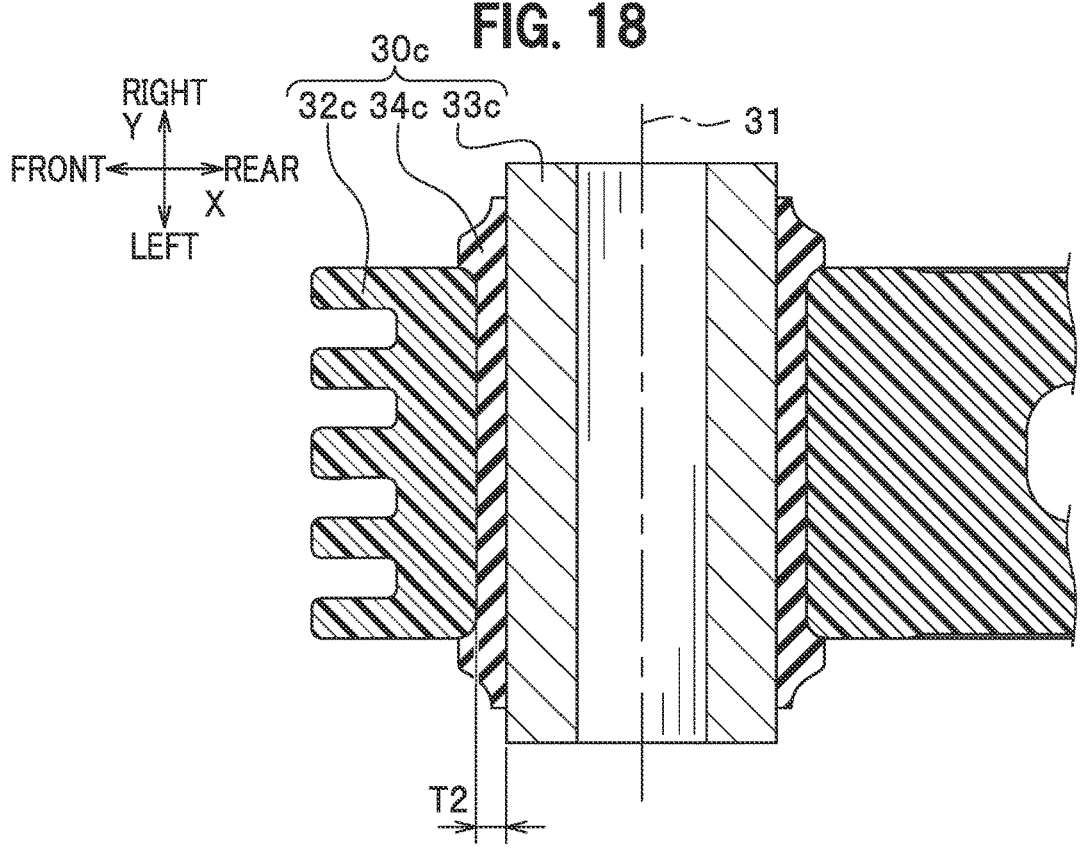
FIG. 18 is a cross-sectional view taken along a line XVIII-XVIII in FIG. 16.
Figure 19:
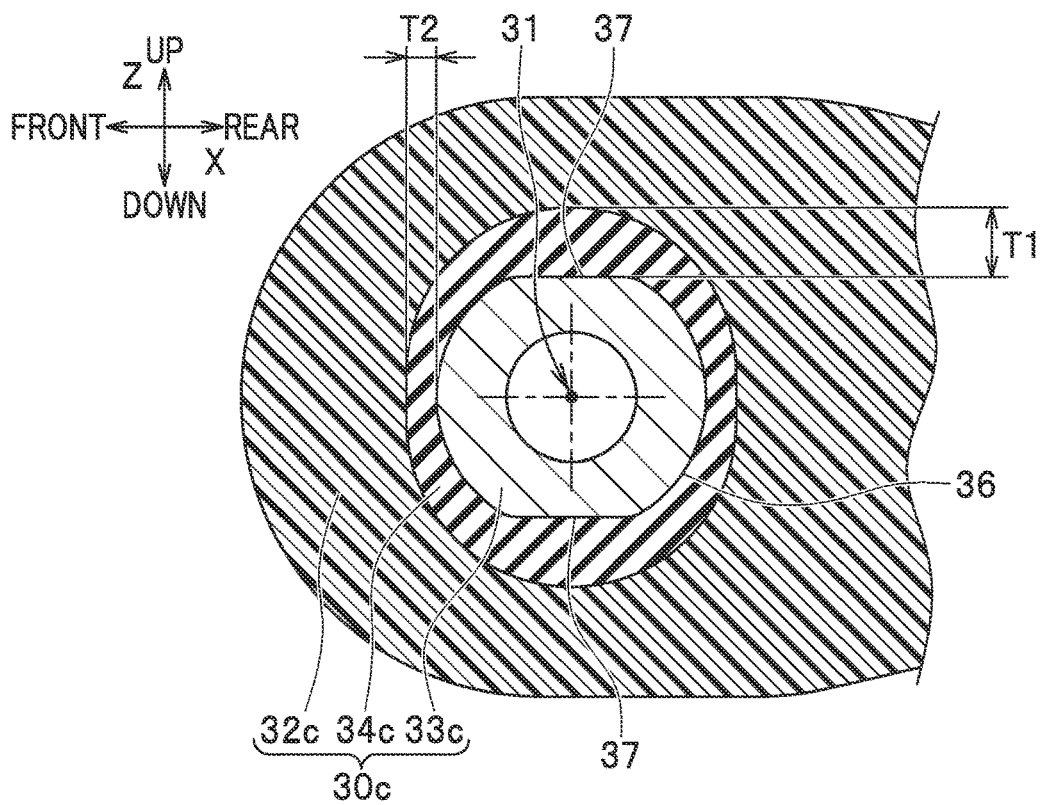
FIG. 19 is a cross-sectional view taken along a line XIX-XIX in FIG. 17.

FIG. 16 is a side view of main parts of the torque rod 1c of the fourth embodiment. FIG. 17 is a cross-sectional view taken along a line XVII-XVII in FIG. 16. FIG. 18 is a cross-sectional view taken along a line XVIII-XVIII in FIG. 16. FIG. 19 is a cross-sectional view taken along a line XIX-XIX line in FIG. 17.

As illustrated in FIGS. 16 to 19, the torque rod 1c includes a small round section 30c as a first coupling section at the front end of the rod body 10. The small round section 30c includes an outer member 32c, an inner member 33c, and an elastic member 34c.

In the fourth embodiment, the inner member 33c has an outer peripheral surface 36 on an outer side in the radial direction of the inner member 33c, as viewed in the Z-axis direction (up-down direction). The outer peripheral surface 36 has recesses 37 formed to be recessed inward in the radial direction with respect to the outer peripheral surface 36. The recesses 37 are desirably formed at the upper and lower ends of the inner member 33c, respectively (see FIGS. 17 and 19).

In this structure, the elastic member 34c is interposed between bottom surfaces of the recesses 37 of the inner member 33c and an inner surface of the outer member 32c. As a result, the thickness T1 in the radial direction of the portion of the elastic member 34c, where the outer member 32c is joined with the inner member 33c in the Z-axis direction, is larger than the thickness T2 in the radial direction of the portion of the elastic member 34c, where the outer member 32c is joined with the inner member 33c in the X-axis direction. In other words, a length in a coupling direction of the portion of the elastic member 34c, where the outer member 32c is joined with the inner member 33c in the Z-axis direction, is larger than a length in a coupling direction of the portion of the elastic member 34c, where the outer member 32c is joined with the inner member 33c in the X-axis direction.

According to the fourth embodiment as described above, the spring constant in the Z-axis direction is made smaller than the spring constant in the X-axis direction in the elastic member 34c, with the simple structure. Thus, the vibration transmission characteristics are lowered.

Note that, in the cross-sectional view of FIG. 19, an inner peripheral surface of the outer member 32c may have a circular shape. Even in this case, the formation of the recesses 37 results in T1>T2. However, a case of the inner peripheral surface of the outer member 32c having an oval or elliptical shape, in which a diameter in the up-down direction is larger than a diameter in the front-rear direction as in the third embodiment, allows the thickness T1 to be greater than the thickness T2, with the formation of the recesses 37.

The present disclosure has been described above, but is not limited thereto, and may be modified within a gist of the present disclosure. Further, additions, deletions, and substitutions may be made to a part of the structure in each embodiment described above.

For example, in the embodiments described above, the outer members 32, 52 and the rod body 10 are made of resin, but are not limited thereto, and may be made of a light metal material such as an aluminum alloy, for example.

Further, in the embodiment described above, the inner member 33 has a cylindrical shape, but is not limited thereto. The inner member 33 may have any structure as long as it can be coupled to a prime mover such as an engine (not shown), and may have a variant of a cylindrical shape such as an elliptical cylinder shape and a square cylinder shape. Still further, the inner member 33 may have a solid bar shape.

Further, in the embodiments described above, the second center axis 51 of the large round section 50 is set perpendicular to the first center axis 31 of the small round sections 30, 30a to 30c, as viewed from the longitudinal direction of the rod body 10, but is not limited thereto. The second center axis 51 of the large round section 50 may be set in the same direction as the first center axis 31 of the small round sections 30, 30a to 30c.

DESCRIPTION OF REFERENCE SYMBOLS 1, 1a to 1c: torque rod; 10: rod body; 30, 30a to 30c: small round section (first coupling section); 31: first center axis; 32, 32a to 32c: outer member; 33, 33c: inner member; 34, 34a to 34c: elastic member; 35, 35a: bore section; 36: outer peripheral surface; 37: recess; 50: large round section (second coupling section); 51: second center axis.

What is claimed is:

1. A torque rod comprising:
   a rod body which is an elongated member;
   a first coupling section provided at one end in an X-axis direction as a longitudinal direction of the rod body and having a first center axis along a Y-axis direction orthogonal to the X-axis direction; and
   a second coupling section provided at the other end in the X-axis direction of the rod body and being larger than the first coupling section,
   wherein the first coupling section includes:
      an outer member having a cylinder shape connected to the rod body;
      an inner member provided in the center of the outer member; and
      an elastic member to elastically join the outer member with the inner member,
   wherein the elastic member has a spring constant in a Z-axis direction orthogonal to the X-axis direction and the Y-axis direction smaller than a spring constant in the X-axis direction.

2. The torque rod as claimed in claim 1, wherein, when it is assumed that a minimum length in the Y-axis direction of the elastic member located between the outer member and the inner member, in a cross-section cut by a plane including the first center axis and being in parallel to the Z-axis direction, is L1, and a minimum length in the Y-axis direction of the elastic member located between the outer member and the inner member, in a cross-section cut by a plane including the first center axis and being in parallel to the X-axis direction, is L2, L1 is smaller than L2.

3. The torque rod as claimed in claim 1, wherein the elastic member has a bore section formed to be recessed or to penetrate in the Y-axis direction, on an outer side in the radial direction of the inner member, as viewed in the Z-axis direction.

4. The torque rod as claimed in claim 1, wherein, when it is assumed that a thickness in the Z-axis direction of the elastic member located between the outer member and the inner member, in a/the cross-section cut by a plane including the first center axis and being in parallel to the Z-axis direction, is T1, and a thickness in the X-axis direction of the elastic member located between the outer member and the inner member, in a/the cross-section cut by the plane including the first center axis and being in parallel to the X-axis direction, is T2, T1 is greater than T2.

5. The torque rod as claimed in claim 1, wherein the inner member has an outer peripheral surface on an outer side in the radial direction of the inner member, as viewed in the Z-axis direction, the outer peripheral surface having a recess formed to have an outer surface of the inner member recessed inward in the radial direction with respect to the outer peripheral surface.

* * * * *